United States Patent
Nürnberg et al.

(10) Patent No.: US 12,378,382 B2
(45) Date of Patent: Aug. 5, 2025

(54) METHOD FOR PRODUCING A FOAM COMPONENT

(71) Applicant: adidas AG, Herzogenaurach (DE)

(72) Inventors: Hans-Peter Nürnberg, Gutenstetten (DE); Jannik Werner, Erlangen (DE); Dietmar Drummer, Erlangen (DE); Lukas Vetter, Erlangen (DE); Sebastian Hertle, Erlangen (DE); Michael Wolf, Erlangen (DE)

(73) Assignee: adidas AG, Herzogenaurach (DE)

( * ) Notice: Subject to any disclaimer, the term of this patent is extended or adjusted under 35 U.S.C. 154(b) by 573 days.

(21) Appl. No.: 17/170,131

(22) Filed: Feb. 8, 2021

(65) Prior Publication Data

US 2021/0246281 A1     Aug. 12, 2021

(30) Foreign Application Priority Data

Feb. 7, 2020   (DE) .................... 10 2020 201 543.0

(51) Int. Cl.
| | |
|---|---|
| *C08J 9/24* | (2006.01) |
| *B29C 44/04* | (2006.01) |
| *C08J 9/232* | (2006.01) |
| *C08J 9/34* | (2006.01) |
| *B29C 44/34* | (2006.01) |

(52) U.S. Cl.
CPC ............ *C08J 9/34* (2013.01); *B29C 44/0407* (2013.01); *C08J 9/232* (2013.01); *C08J 9/24* (2013.01); *B29C 44/3403* (2013.01); *C08J 2201/032* (2013.01); *C08J 2205/048* (2013.01); *C08J 2300/00* (2013.01)

(58) Field of Classification Search
CPC . B29C 44/445; B29C 67/205; B29C 44/0407; B29C 44/3403; C08J 9/34; C08J 2201/032; C08J 2205/048; C08J 2300/00; C08J 9/24; C08J 9/22–232; C08J 9/16–232; C08J 2203/22
USPC ......................................................... 264/101
See application file for complete search history.

(56) References Cited

U.S. PATENT DOCUMENTS 3,505,249 A * 4/1970 Skochdopole ........... C08J 9/228
                                                          521/143
4,031,179 A * 6/1977 Tatzel ................... B29C 44/445
                                                          264/102
(Continued)

FOREIGN PATENT DOCUMENTS

CN         105451956 A       3/2017
DE           1729011 A1     10/1967
(Continued)

OTHER PUBLICATIONS

Britton, R. Update on Mouldable Particle Foam Technology. Chp. 1-2. iSmithers Rapra Publishing. (Year: 2009).*
(Continued)

*Primary Examiner* — Christina H. W. Rosebach
(74) *Attorney, Agent, or Firm* — Sterne, Kessler, Goldstein & Fox P.L.L.C.

(57) ABSTRACT

A method for producing a foam component includes providing a particulate starting material in a mold, softening the starting material, inducing a pressure change within the mold to cause foaming in at least a portion of the softened starting material without the use of a blowing agent, and solidifying the foamed starting material.

30 Claims, 8 Drawing Sheets

(56) References Cited

U.S. PATENT DOCUMENTS

| | | | |
|---|---|---|---|
| 5,308,560 | A | 5/1994 | Bibby et al. |
| 5,476,619 | A | 12/1995 | Nakamura et al. |
| 2012/0329892 | A1* | 12/2012 | Prissok ................ A43B 13/023 521/155 |
| 2014/0223673 | A1* | 8/2014 | Wardlaw ................ B29C 43/18 12/146 B |
| 2016/0001476 | A1 | 1/2016 | Sommer et al. |
| 2017/0334107 | A1* | 11/2017 | Bhargava ............ B29C 44/3403 |
| 2018/0155518 | A1* | 6/2018 | Koshita .................. C08L 75/04 |

FOREIGN PATENT DOCUMENTS

| | | | |
|---|---|---|---|
| DE | 102015000393 A1 | 7/2015 | |
| DE | 102016223980 A1 | 6/2018 | |
| DE | 102018008534 A1 | 4/2020 | |
| EP | 1 162 051 A2 | 12/2001 | |
| EP | 2139658 B1 | 3/2008 | |
| EP | 1 995 033 A1 | 11/2008 | |
| EP | 3 338 984 A2 | 6/2018 | |
| GB | 1060908 A | 3/1967 | |
| JP | 49-10266 A | 1/1974 | |
| JP | 51-56875 A | 5/1976 | |
| JP | 59-45137 A | 3/1984 | |
| JP | 2002-210773 A | 7/2002 | |
| JP | 2012-214636 A | 11/2012 | |
| JP | 2014-218066 A | 11/2014 | |
| JP | 2017-29689 A | 2/2017 | |
| WO | 2005/102667 A2 | 11/2005 | |
| WO | 2015182721 A1 | 3/2015 | |
| WO | WO-2016085536 A1 * | 6/2016 | ......... B29C 44/3403 |
| WO | 2021/050938 A1 | 3/2021 | |

OTHER PUBLICATIONS

Verbelen, L. et al. Analysis of the material properties involved in laser sintering of thermoplastic polyurethane. Additive Manufacturing 15 (2017) 12-19 (Year: 2017).*

Kutz, Myer. (2015). Mechanical Engineers' Handbook, vol. 1—Materials and Engineering Mechanics (4th Edition)—9.4.1 Polyurethanes. John Wiley & Sons. Retrieved from https://app.knovel.com/hotlink/pdf/id:kt011UOFB2/mechanical-engineers/polyurethanes (Year: 2015).*

Vetter et al. "Influence of vacuum on the morphology and mechanical properties in rotational molding", published in the International Journal of Polymer Science, Bd. 59, 2019, H. 8, S. 1544-1551. ISSN 1548-2634 (E); 0032-3888. DOI: 10.1002/pen.25152, 13 pages.

* cited by examiner

METHOD FOR PRODUCING A FOAM COMPONENT

TECHNICAL FIELD

Embodiments of the present invention relate to a method for producing a foam component, a mold for performing the method, and a foam component produced in such a way.

BACKGROUND

The production of foam components using blowing agents is a well-known process. Foaming of polymers with blowing agents may take place, for example, in a physical or chemical way. In addition, low-viscosity polymers may also be processed to foam structures mechanically, e.g., by spraying. In known physical foaming processes and methods, the blowing agent is dosed into a melt under high pressure and is thus dissolved therein. Typical blowing agents are hydrocarbons, especially butanes and pentanes, as well as the inert gases carbon dioxide and nitrogen. In known chemical processes, chemical substances are introduced into the melt, which form gaseous products in a chemical reaction under the influence of heat. Typical chemical blowing agents are isocyanate, azodicarbonamide, hydrazine, zinc carbonate, or sodium bicarbonate. Common processes in which the physical or chemical foaming process is used are injection molding, extrusion, or autoclave processes. Here the cell formation or nucleation of the dissolved gas takes place by a pressure drop, as, for example, when the melt leaves the nozzle in the case of foam extrusion. The cell growth and the resulting foam cells are mainly determined by the occurring pressure drop, the blowing agent content, and the blowing agent distribution in the material. A stabilization of the cells occurs by cooling and solidifying of the plastic.

For example, WO 2015/182721 A1 refers to the production of a foam-molded article.

CN 105 451 956 B refers to a method for producing a low-density foamed article.

EP 2 139 658 B1 refers to a method for producing foamed plastic parts with a solid outer skin and a foamed core.

Furthermore, Vetter et al. in "Influence of vacuum on the morphology and mechanical properties in rotational molding," published in the International Journal of Polymer Science, refer to the fact that rotational molding is suitable for the production of seamless hollow bodies with a high degree of design flexibility.

It has been found to be a disadvantage of known foaming processes that a large proportion of the known blowing agents may have a negative impact on the environment. In addition, there is a risk that some of the blowing agent may remain in the produced foam component, which, in addition to the above-mentioned environmental pollution, may also have a negative effect on the health of living creatures near these foam components, e.g., components of a sports article, insulating materials in vehicles, etc. Furthermore, the use of blowing agents in the production of foam components causes additional costs, which reduces the efficiency of these processes.

SUMMARY OF THE INVENTION

The above-outlined problems are addressed and are at least partly solved by the different aspects of the present disclosure.

An aspect of the present disclosure is therefore to provide a method for producing a foam component which overcomes or at least mitigates the disadvantages of the state of the art. In particular, the method according to the present disclosure enables an efficient production of foam components, which does not require the extra addition of blowing agents. For example, the method according to claim 1 provides such a method. The dependent claims comprise advantageous further embodiments.

The method for producing a foam component according to the present disclosure comprises the steps of providing a particulate starting material in a mold, softening the starting material, inducing a pressure change within the mold to cause foaming in at least a portion of the softened starting material without the use of a blowing agent, and solidifying the foamed starting material.

By inducing a change in pressure within the mold, it is possible to cause foaming in at least a portion of the softened starting material. Thereby, the softening of the starting material may initially lead to a local sintering of the particles. The foaming according to the present disclosure does not require the use of an additional blowing agent besides the process atmosphere. In the context of this disclosure, additional blowing agents refer to conventional blowing agents, which are already known from chemical or physical foaming processes in the state of the art, for example. The foaming according to the present disclosure may thus be categorized as a physical foaming without additional blowing agent. Thus, the present disclosure not only represents an efficient and more cost-effective way of producing a foam component compared to conventional methods based on additional blowing agents. By eliminating the need for an additional blowing agent, the environmental balance is also improved, which enables a more sustainable production of foam components.

In some embodiments, the starting material may comprise particles of a size of 0.01 to 3 mm, preferably from 0.02 to 1.5 mm, particularly preferably from 0.05 to 0.7 mm. The choice of particle size has a decisive effect on the quality of the foam component produced from it, wherein the specified range of particle size has proven to be particularly advantageous. In particular, the particle size may be used to specifically influence the final cell size in the foam component produced. Furthermore, the particle size may influence the cell distribution, which may be adjusted according to the use of the foam component.

The starting material used in this disclosure may be a thermoplastic and/or cross-linking polymer material. Cross-linking polymer materials may comprise thermoset materials. In this way, the present disclosure represents a method for a variety of different starting materials.

In some embodiments, the softened starting material may comprise a viscosity in the range of $10^1$ to $10^5$ Pa·s, preferably $10^2$ to $10^4$ Pa·s. The specified viscosity of the softened starting material is particularly advantageous for causing the foaming. For example, sufficient flowability and/or deformability of the starting material is a prerequisite for the expansion of inclusions in the starting material upon an induced pressure drop. If the viscosity of the softened starting material is too low, the gas inclusions may not be stabilized in the softened starting material before or during an expansion process. In this case the gas inclusions may diffuse to the surface. On the other hand, if the viscosity is too high, a considerable pressure difference may be necessary to cause an expansion process at all. The choice of the viscosity of the softened starting material may also influence the type of gas inclusions, especially a thickness of the cell walls of the expanded gas inclusions.

In some embodiments, the softening of the starting material may comprise an inclusion of at least one gas, in particular air or nitrogen, in the softened starting material. During the softening of the starting material, viscous particle edge layers may form, which is generally referred to as "sintering." In the course of these sintering processes, the process gas or process gas mixture, in particular air or nitrogen, present between the particulate starting material is enclosed in the softened starting material. Alternatively or additionally, such gas inclusions may be caused by starting materials with particles of porous nature. In this case, the at least one gas may not only be present between the individual particles, but may already be present within the porous particulate starting material. In both cases, chemical blowing agents or additional gases may be dispensed with in the mold, thus helping to protect the environment. In addition, the use of gases or gas mixtures already present in the mold, such as air, may reduce the costs of the method. Furthermore, it is possible to use a protective gas, such as nitrogen, as process gas to avoid thermo-oxidative degradation processes in the softened starting material. Similar to the use of air as a process gas mixture, this would also be environmentally friendly and/or cost-effective. Furthermore, the use of a protective gas may be gentler on the material than air.

In addition, the foaming may be caused by expansion of at least one gas trapped in the softened starting material. In this way, the present disclosure represents a particularly advantageous method of generating gas inclusions in a softened material and causing them to expand and thus to foam by changing the pressure within the mold.

In some embodiments, the softening of the starting material may comprise heating of the starting material. Softening the starting material by heating represents a method step which may be controlled very precisely with current control technology. This is an important factor for the production of a high-quality foam component according to the present disclosure. For example, by heating, it is possible to adjust a viscosity of the softened material very precisely, which in turn may influence the foam formation.

Furthermore, the heating of the starting material may comprise heating by direct heat input into the starting material or heat input via the mold. Additionally or alternatively, the heating may be done by heat conduction or convection.

In case of a direct heat input into the starting material, it may be realized by electromagnetic radiation, especially in the range of 1 to 300 GHz. In addition, thermal radiation, especially in the infrared range, may be used. In both cases it is possible to direct the radiation directly into the mold or to place the radiation emitter inside the mold. In this way, the present disclosure enables heating of the starting material inside the mold without having to heat the mold itself. Thus, the energy and cost efficiency of the present method may be improved compared to conventional state-of-the-art processes.

In case of a heat input into the starting material via the mold, a declining temperature gradient from the mold wall to the inside of the mold may be present in the softened starting material. In this way, for example, the particulate starting material in contact with the inner wall of the mold is softened first. This may cause the layer of the starting material that was softened first to adhere to the wall of the mold. Particles further inside may consequently sinter through contact with the already plasticized particles. Thus, the particulate starting material may melt layer by layer until the entire material is in a molten state. This leads to an advantageous gas inclusion in the softened starting material according to the present disclosure.

In some embodiments, a number of gas inclusions in the softened starting material may be adjustable via a temperature profile of the heating. With an extensive heat supply, depending on the solubility of the gas or gas mixture present, such as air or nitrogen, diffusion of the gas molecules in the softened starting material, especially into the polymer melt, may occur. Thereby, the number of gas inclusions in different layers or regions may be selectively adjusted according to the temperature profile of the region of the softened starting material. For example, it is possible to reduce the number of gas inclusions by heat supply.

In particular, an edge layer of the starting material which is in contact with the mold may comprise fewer gas inclusions than other regions of the starting material. If the heat input is caused via the mold, a heating of the starting material from outside to inside occurs. In this way gas inclusions in the regions of the softened material in contact with the mold wall may be reduced or dissolved first. This makes it possible, for example, to produce integral foam structures with an adjustable edge layer thickness by means of targeted temperature control. The term "integral foam structure" is to be understood in relation to the present disclosure as foam structures which comprise a core of foam cells and an essentially cell-free edge. The term "essentially cell-free edge" encompasses fluctuations and inaccuracies typical for production.

In this case, the edge layer may comprise a thickness of 0.1 to 2.0 mm, preferably of 0.3 to 1.7 mm, particularly preferably of 0.5 to 1.5 mm. In this way, the present disclosure represents a method for producing integral foam structures comprising a preferred thickness of the edge layer of a few micrometers. Hereby a particularly high bending strength of the foam component may be achieved. Furthermore, a low density of the foam component may be achieved. A low density, for example, has a positive effect on the weight of the foam component. In addition, material costs for producing the foam component may be reduced.

In some embodiments, a processing temperature of the starting material may be above its melting temperature. In this way, for example, a density of gas inclusions in the softened material may be controlled. Thus, a structure of the foam component, in particular a foam density or a foam degree, may be advantageously adapted to the respective use.

In some embodiments, a temperature inside the mold may be different in at least two regions of the mold. Furthermore, the choice of the temperature at which the pressure change is brought about may influence the properties of the foam component, such as density, cell size, cell distribution, etc. In this way, at inhomogeneous thermal conditions, which may be specifically adjusted by local temperature control of different regions within the mold, for example, a local foaming or a locally different foaming may be caused. It is also possible to generate graded properties via a locally varying temperature profile within the mold.

In some embodiments, the pressure change may comprise a reduction of the pressure. By reducing the pressure within the mold, any gas inclusions within the softened starting material that may be present or may be deliberately caused will adapt to the pressure reduction, especially by expansion. Thus, pressure reduction may be used advantageously to provide for foaming. A prerequisite for expansion of the gas inclusions due to the induced pressure reduction is sufficient flowability or deformability of the softened starting material surrounding the expanding gas inclusions. In case that a gas expansion is possible due to the external factors, the foaming may take place at least until the pressure present in the gas inclusions corresponds to the pressure set by the pressure reduction in the mold. In this way, the pressure reduction may comprise a parameter for adjusting the size increase of the gas inclusions, in particular a foam bubble size resulting therefrom.

In some embodiments, the pressure change may amount to 0.05 to 5.0 bar, preferably 0.1 to 2.0 bar, particularly preferably 0.2 to 1.0 bar. In contrast to methods from the state of the art, for a method for producing a foam component according to the present disclosure, a pressure change of only a few hundred millibars may be sufficient. Hence, molds that may be produced more cheaply are suitable for the method according to the present disclosure and may only be adapted for small pressure differences. This may lead to a considerable cost reduction of the claimed method. Especially in the production of large foam components, such as tanks, housings for devices and equipment, etc., which are usually produced by rotational molding, considerable cost savings may be achieved in mold production due to the low pressure differences required. In addition, lower pressure differences within the mold are achieved more quickly compared to methods from the state of the art. Thereby, the duration of the production process of individual foam components may be shortened, making the method according to the present disclosure more efficient than longer lasting methods from the state of the art. In addition, the method according to the present disclosure may offer the possibility to make physical foaming accessible for methods in which physical foaming is largely excluded, since a more cost-intensive molding technique for adapting the molds for high pressures would otherwise be necessary.

In some embodiments, an initial pressure in the mold before the softening may correspond to atmospheric pressure or overpressure. Further, one of the parameters for causing the foaming in the softened starting material is the absolute value of the pressure change after softening of the starting material. Thus, an initial pressure at one atmosphere may cause the foaming by creating negative pressure in the mold. On the other hand, it is possible to use an initial pressure above one atmosphere, i.e., with overpressure in the mold, to cause the foaming by reducing the overpressure, especially up to atmospheric pressure. In this way, the method according to the present disclosure represents a flexible method with respect to the internal pressure of the mold. This may, for example, play an important role with respect to the mold to be used. In particular, the mold's suitability for overpressure or underpressure, including in light of further manufacturing steps after inducing the pressure change (e.g. during or after solidifying the foamed starting material), and/or other parameters, may be taken into account in implementing the method according to the present disclosure.

Furthermore, by generating an overpressure at a point in time when only a part of the starting material, in particular an outermost layer or region, is in a softened state, gas inclusions in this softened part may be reduced. In parts, layers, or regions which are softened only after overpressure has been generated, gas inclusions may still occur. By reducing the pressure at a later time, these gas inclusions, which remain in the softened parts after the overpressure has been generated, may be expanded. By controlling the points in time at which overpressure or underpressure is applied in the mold, a layer thickness, a degree of foaming, a material density, or other parameters of the foam component, of the individual layers, or of the entire foam component may be specifically adjusted. Furthermore, the overpressure may comprise compressed air. In this way, cost-intensive and/or environmentally harmful use of additional gases may be avoided in the production of foam components according to the present disclosure. Alternatively, the overpressure may comprise compressed nitrogen. Compared to air, this provides an equally cost-effective and/or environmentally friendly method for producing foam components. Furthermore, thermo-oxidative degradation processes in the softened starting material may be avoided by the use of nitrogen.

In some embodiments, the inducing of the pressure change may comprise inducing the pressure change upon reaching or exceeding the melting temperature of at least a portion of the starting material. Additionally, a viscosity of the starting material changes depending on the temperature. Furthermore, the foaming according to the present disclosure develops differently depending on the viscosity of the softened material with respect to the already mentioned parameters of the foam, such as density, cell size, number of cells, etc. Thus, the possibility of inducing the pressure change at different temperatures in relation to the melting temperature of the starting material represents a possibility for adjusting the parameters of the foam component.

In some embodiments, an absolute value of the pressure change within the mold may be different in at least two regions of the mold. Since the absolute value of the pressure change represents an essential parameter for the size of individual cells in the foamed starting material, a varying cell size in the foam component may be adjusted by at least two different pressure change ranges.

In some embodiments, the foaming in each of these regions may be individually adjustable by a temperature and/or pressure difference in at least two regions within the mold. Thus, the method according to the present disclosure offers the possibility to individually adjust individual regions of the foam component. For example, in regions with an increased need for stability, a cell size within the foam component may be deliberately kept small. Furthermore, the cell size may be increased and/or a density of the starting material may be reduced in another part where low weight is advantageous.

In some embodiments, the foaming may not be caused in at least one region of the mold. In this way, the present disclosure provides a possibility to provide foamed and non-foamed regions in a foam component within a production process. An additional joining of foamed and non-foamed regions may thus be dispensed with.

In some embodiments, the solidifying may comprise solidifying after inducing the pressure change. A stabilization or solidification of the resulting foam structure takes place as soon as the flowability or deformability due to a selected pressure change does not allow further expansion of the gas inclusions. It is therefore advantageous to wait until after the induced pressure change, especially after the foaming has been initiated, before solidifying. In the case of cross-linking starting materials, e.g., thermoset starting materials, a cross-linking reaction may lead to a solidification or stabilization of the foam structure.

In some embodiments, the solidifying may comprise cooling of the foamed starting material. In the case of thermoplastic starting materials, for example, the solidifying may be achieved by solidifying the softened starting material during a cooling process. Thus, a cooling of the foamed starting material, especially by cooling the mold, may be an advantageous and well controllable process for solidifying.

In some embodiments, a density of the foam component may be at least partially adjustable by an amount of the pressure change. The increase in size of individual gas inclusions in the softened starting material may be adjusted by an amount of the pressure change. Since the increase of the size of the gas inclusions of the foam material component means a reducing of its density, the density of the foam component may thus be adjusted by the amount of the pressure change in an efficient way.

In some embodiments, a structure of the foam component may be influenced at least partially by at least one of the following properties of the starting material: material of the particles, particle shape, particle size, and particle size distribution.

The method according to the present disclosure for producing foam components offers, in addition to the control of the density by means of pressure, further possibilities on the process side to influence the properties of the resulting foam components. For example, the choice of the starting material represents a central control variable. Furthermore, the initial diameter of the starting material in the softened state and before expansion of existing gas inclusions is decisive for the final cell size and distribution in the foamed starting material. Thus, the particle shape, particle size, and particle size distribution may have a positive influence on the resulting foam structure. In the same way, the foam structure may be set or adjusted differently locally or in parts of the foam component by the use of different particle sizes, which may be arranged in the mold in a separated way from each other, for example side by side. The varying bubble diameters of the resulting gas inclusions may thus lead to different degrees of foaming in the corresponding regions or parts after foaming with a uniform pressure drop in the mold. A multimaterial application or the use of polymer blends is also possible according to the present disclosure and represents a further parameter for influencing or adapting the foam component. For example, the particles of the starting material may comprise a so-called "core-sheath structure," whereby a particle core and a particle sheath may comprise different properties such as softening or solidification behavior or similar. In this way, among other things, the processing and/or application properties of a foam component according to the present disclosure may be deliberately optimized. It is also possible to coat a thermoplastic particle core in a thermoset or elastomeric manner. In this way, for example, an improved compressive deformation behavior of the softened starting material may be achieved. Likewise, elastomeric particle cores, for example recycled material, e.g., from old car tires or used sports articles, may be coated with a thermoplastic particle coating for producing foam components according to the present disclosure.

In some embodiments, the method may further comprise introducing a second material into the mold. In this way, the method provides a production of a foam component which may be adapted to a variety of uses.

In some embodiments, the second material may comprise a filler or a reinforcing element. Thus, for example, besides an advantageous low density of the foam component, a particularly high stability of the foam component may be achieved. Likewise, a variety of properties of other materials, in particular of fillers or reinforcing elements, may be integrated into the foam component by means of the method according to the disclosure.

In some embodiments no foaming may occur in the second material. In this way, the basic properties of the second material may be retained despite a foaming in at least part of the starting material. Furthermore, a combination of the properties of both materials is possible.

In another aspect, the present disclosure relates to a foam component produced by a method according to one of the previous embodiments.

The numerous advantages of the present disclosure, which have already been explained above in relation to examples of a method for producing a foam component, are equally applicable to examples of a foam component and a mold for producing a foam component.

In some embodiments, the foam component may comprise a hollow body. In this way, the method according to the present disclosure, especially by rotational molding, represents an efficient possibility to produce high-quality hollow bodies from foamed material without using chemical blowing agents.

In some embodiments, the foam component may comprise a non-foamed edge layer.

In some embodiments, the edge layer may comprise a thickness of 0.1 to 2.0 mm, preferably of 0.3 to 1.7 mm, particularly preferably of 0.5 to 1.5 mm.

In some embodiments, the foam component may be free of blowing agents.

In some embodiments, the foam component may comprise open-cell, mixed-cell, or closed-cell gas inclusions. In this way, different properties, such as absorption of liquids in the case of open-cell gas inclusions or, in contrast, repellence of liquids in the case of closed-cell gas inclusions, may be set in the foam component produced. In the case of closed-cell gas inclusions, a foam component according to the present disclosure is, due to its adjustable density, advantageously suited as a buoyancy aid in floating bodies, in particular boats, swimming aids, or surfboards.

In some embodiments, the foam component may comprise an integral foam structure. In some embodiments, the foam component may be formed as an insulating material. Since an expansion of the gas inclusions is adjustable in foam components according to the present disclosure, and since air and a plurality of polymer materials provide poor heat conduction properties, the foam components according to the present disclosure may be particularly well suited as insulating material.

In some embodiments, the foam component may comprise a damping material, in particular for sports articles. As already mentioned above, the method according to the present disclosure may be used to adjust the number and size of gas inclusions in a foam component. Furthermore, this method may be used to produce foam components from starting materials with rubber-elastic properties, such as thermoplastic elastomers. In this way, damping materials with excellent mechanical damping properties and comfort features, such as those advantageous for shoe soles, may be produced particularly efficiently. In particular, different elements of a shoe sole, including outsole, midsole or the like, for which it is advantageous to have different properties, such as thermal insulation, damping, cushioning, etc., may be produced in one process step according to the present disclosure. This may eliminate the need for time- and cost-intensive joining or gluing of the individual elements.

In some embodiments, the foam component may comprise a part of a sports article, in particular a ball or protector. A part of a ball may, for example, comprise one layer of a panel or a plurality of different layers of a panel. The different layers may comprise, among others, an outer top layer, a middle foam layer and a base layer, each of which comprises different properties. The plurality of different layers may be produced separately and subsequently joined together. Alternatively, the plurality of different layers, in particular including an inner bladder of the ball, may be advantageously produced in one process. In this way, the present disclosure provides a particularly sustainable method for producing balls, in which gluing of the individual panel layers may be dispensed with. In addition, producing individual layers in one process step considerably reduces the amount of residual material compared to conventional methods, which are already known from the state of the art. It should be noted that the production of a plurality of different layers in a method according to the present disclosure is not limited to the production of balls, but is suitable for a plurality of foam components. If the part of a sports article relates to a protector, these may comprise helmets, shin guards, breastplates, joint protectors, etc. Such protectors may be adapted for attachment to sportswear. Furthermore, the component part of a sports article may comprise at least part of a backpack, bag, stick, in particular a field hockey stick, or similar.

In another aspect, the present disclosure relates to a mold adapted for performing a method for producing a foam component according to the present disclosure and comprising a control device, in particular for reducing the pressure in the mold.

In some embodiments, the mold may be adapted for a maximum pressure up to 50 bar, preferably 25 bar, particularly preferably 10 bar, and most preferably atmospheric pressure.

In some embodiments, the mold may be adapted for a minimum pressure up to 0.8 bar, preferably 0.5 bar, more preferably 0.2 bar, particularly preferably 0.1 bar.

In some embodiments, the pressure and/or a temperature may be individually adjustable in at least two regions within the mold.

In some embodiments, the mold may be adapted to be movable. In this way, the mold according to the present disclosure is suitable for a variety of molding processes, in particular for rotational molding or movement molding.

BRIEF DESCRIPTION OF THE FIGURES

Aspects of the present disclosure will be described in more detail with reference to the following figures.

DETAILED DESCRIPTION

In the following, exemplary embodiments of the present disclosure with respect to a foam component will be explained in more detail. While specific combinations of features are described in relation to the exemplary embodiments of the present disclosure, it is to be understood that the disclosure is not limited to such embodiments. In particular, not all features need to be present in order to realize the present disclosure, and the embodiments may be modified by combining certain features of one embodiment with one or more features of another embodiment.

An example of a method 100 according to the present disclosure for producing a foam component is described below with reference to FIGS. 1A-1F.

The method 100 comprises as a first step providing a particulate starting material (e.g., powder, pellets, microgranules, or similar) in a mold. The size of the particles, which is to be understood as the longest expansion direction of a particle, may cover a range between 0.01 and 3 mm. It should be noted that FIGS. 1A-1F do not show a closed mold for reasons of clarity. Instead, the bearing surface of the particles represents a side wall 131 of a mold according to the present disclosure, on which a first layer of a particulate starting material 110 is provided in FIG. 1A.

The method 100 further comprises the step of softening the starting material. In FIGS. 1A-1E, the softening is represented by heating 120 of the particulate starting material 110. This process may be performed at a constant initial pressure $p_0$, wherein $p_0$ may be atmospheric pressure or overpressure. The heating 120 is achieved by means of heat input via the mold, which may be achieved by irradiating the mold wall 131, in particular by means of infrared radiation (IR radiation), or a variothermally temperature-controlled mold wall 131. Alternatively, heating may also be achieved by direct heat input into the starting material, for example, by electromagnetic radiation or IR radiation. In this case, a radiation emitter may be placed inside the mold. A preferred range of electromagnetic radiation is between 1 and 300 GHz.

Figure 1A:
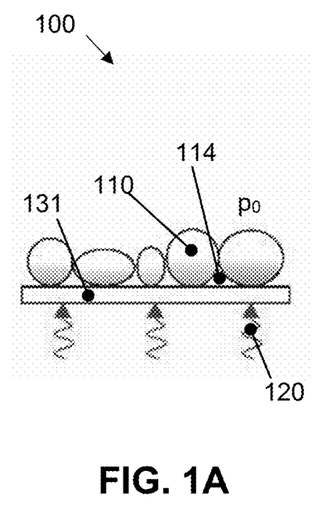
FIGS. 1A-1F show a schematic illustration of a method of producing a foam component according to some embodiments.
Figure 1B:
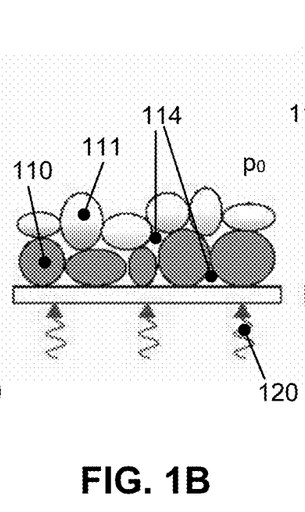
Figure 1C:
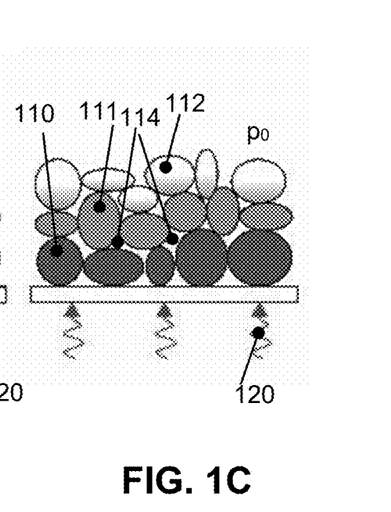
Figure 1D:
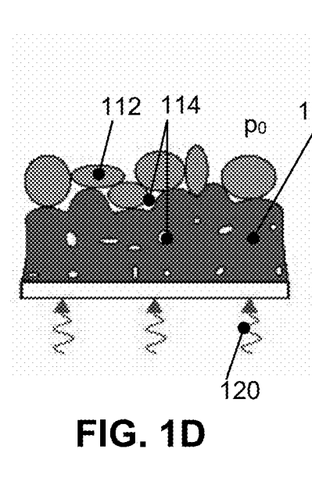
Figures 1E, 1F:
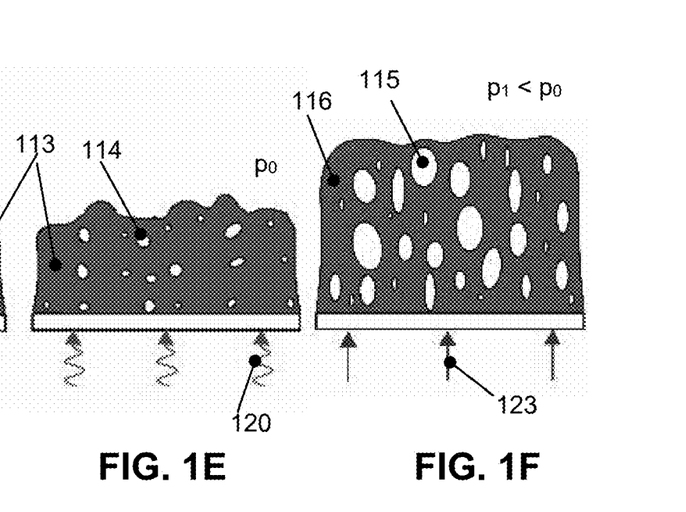

Due to the heating 120 of the mold wall 131, the first layer of the particulate starting material 110 begins to soften over time and adhere to the mold wall 131, which is shown schematically in FIG. 1B for the first layer 110. Further particles in a second 111, third 112, and further layers begin to sinter with particles that have already been softened and plasticized. Thus, the particulate starting material melts layer by layer until the entire starting material is in a softened, especially molten liquid, state 113. This process is shown in FIGS. 1C-1E. It should be noted that for reasons of clarity, the individual layers in FIGS. 1A-1D are added step by step. However, it is preferable to provide at least part of the particulate starting material in one step and then soften it layer by layer as shown.

During the melting, gas inclusions 114 between the individual particles are trapped by the sintering processes occurring in the melt phase that is forming. The trapped gas or gas mixture 114 may be air or nitrogen. Further gas inclusions 114 may also be created, for example, by using starting materials with particles of a porous nature. The particle size, shape, and particle size distribution may significantly define the dimension, number, and distribution of the gas inclusions 114 in the melt 113 and thus the starting condition for the foaming. The polymer materials used may be thermoplastic materials and/or cross-linking materials. A further prerequisite for the foaming is that the softened material must be in the viscous phase, wherein a viscosity in the region of $10^1$ to $10^5$ Pa·s, preferably $10^2$ to $10^4$ Pa·s, is advantageous for a foaming. In this range, the viscous melt may provide space for expanding gas inclusions due to its flowability, which is what makes expansion possible in the first place. On the other hand, the melt is tough enough in this viscosity range to bind the expanding gas inclusions 115 in the melt. The binding may at least partially prevent the expanded gas inclusions 115 from rising in the melt due to their lower density compared to the softened starting material 113. On the other hand, the binding may prevent a cell collapse or a cell wall break-through of the expanded gas inclusions 115 in the melt. In this way, the viscosity of the softened starting material may be a parameter for the formation of different cell structures, e.g., open-cell, mixed-cell, closed-cell, or similar, in addition to the amount of the induced pressure change.

In a further step, the method 100 comprises the step of inducing a pressure change within the mold to cause foaming in at least a part of the softened starting material 113 without the use of an additional blowing agent besides the process atmosphere. The foaming is based on an expansion of the trapped gases 114 within the melt 113. The expansion may be caused by an induced pressure drop within the mold, wherein the applied mold pressure at the beginning of the process and the pressure applied to induce foaming are represented by $p_0$ and $p_1$, respectively. A preferred pressure change may lie in a range from 0.05 to 5.0 bar, wherein already a pressure change in the range from 0.2 to 1.0 bar may be sufficient for an expansion. The reduction of the initial pressure may be done by an external pump. On the other hand, it is also possible to induce a pressure reduction by increasing the hermetically sealed volume of the mold, for example by moving at least a part of a mold wall 131. The foaming may be considered complete when the pressure inside the gas inclusions 115, based on the expansion, has adapted to the reduced pressure $p_1$ within the mold.

In a final step of the method 100, the foamed starting material 116 has to be solidified or stabilized together with the expanded gas inclusions 115. The stabilization of the expanded gas inclusions 115, which subsequently form the foam cells of the foam component, may occur by solidifying the foamed starting material 116 by means of a cooling process 123. Alternatively, in the case of cross-linking polymer materials as starting material, a triggering of a cross-linking reaction may lead to the stabilization of the foam cells 115.

Figure 2:
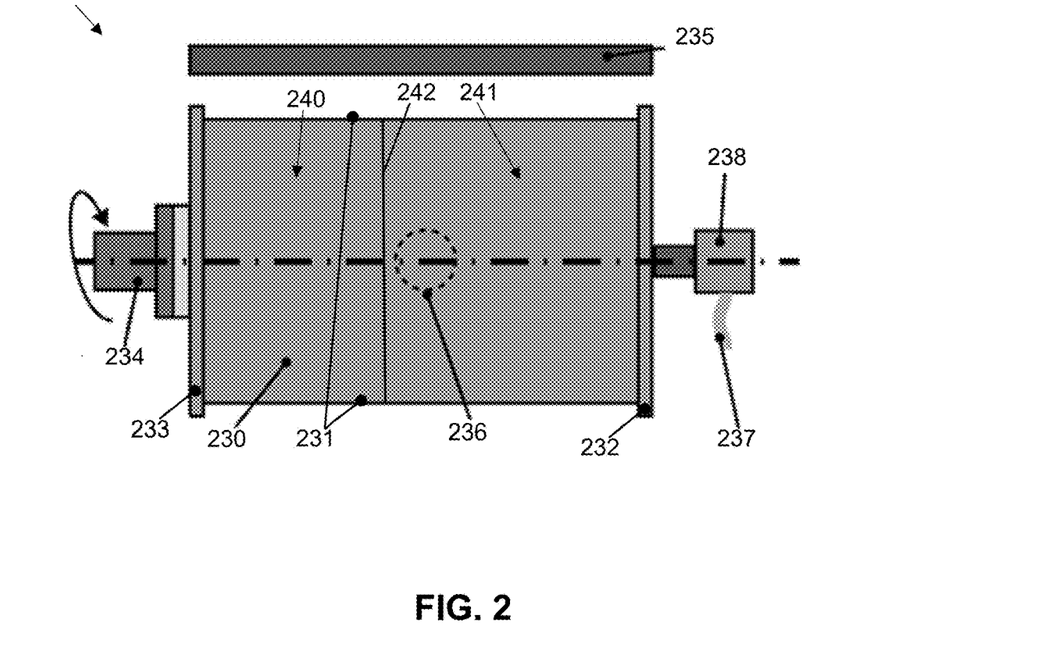
FIG. 2 shows a schematic illustration of a mold for producing a foam component according to some embodiments.

An embodiment of a mold 230 according to the present disclosure for producing a foam component is described in the following with reference to FIG. 2.

The assembly 200 comprises a mold 230, which is rotatably mounted on a shaft 234. By means of a uniform rotation, for example, a substantially constant thickness of a foam component may be produced, wherein "substantially constant thickness" includes instances in which minor production-related differences in thickness in the order of 1-5% are present. The mold 230 comprises a cylindrical outer wall 231, which may be hermetically sealed with a lower flange 232 and an upper flange 233. The mold 230 may be suitable for producing hollow bodies, for example. Furthermore, the mold 230 is suitable for both underpressure as well as overpressure in a range from 1 mbar up to 50 bar, wherein a pressure difference of only a few hundred millibars after softening of the starting material may be sufficient for foam formation. The outer wall 231 may be heated by an IR radiator 235, whereby the starting material in the mold 230 (not shown in FIG. 2) may be heated via the outer wall 231. For process control, a pyrometer 236 is located inside the mold 230, which may determine the temperature of the softened starting material and/or the melt. Other temperature sensors, such as a thermoelement or an oscillating quartz crystal, may be used instead of or in conjunction with the pyrometer 236. In order to be able to vary the internal pressure of mold 230, a connector 237 is attached to the lower flange 232 via a rotary union 238. This connector 237 may be connected to a vacuum pump for pressure reduction as well as to a compressor or a device using compressed gas to generate overpressure. The mold 230 may be divided into two or more individual segments, e.g., individual segments 240 and 241 divided by line 242 (as shown in FIG. 2), in which the internal pressure may be individually adjusted. Individual regions of the mold may also be heated or cooled separately. By a subdivision of the mold, a graded or sectionally different foam component may be produced. The subdivision shown in FIG. 2 (individual segments 240 and 241 divided by line 242) is only one example. Different subdivisions (e.g., in different locations, with more individual segments, different sizes, etc.) may be used.

Figure 3:
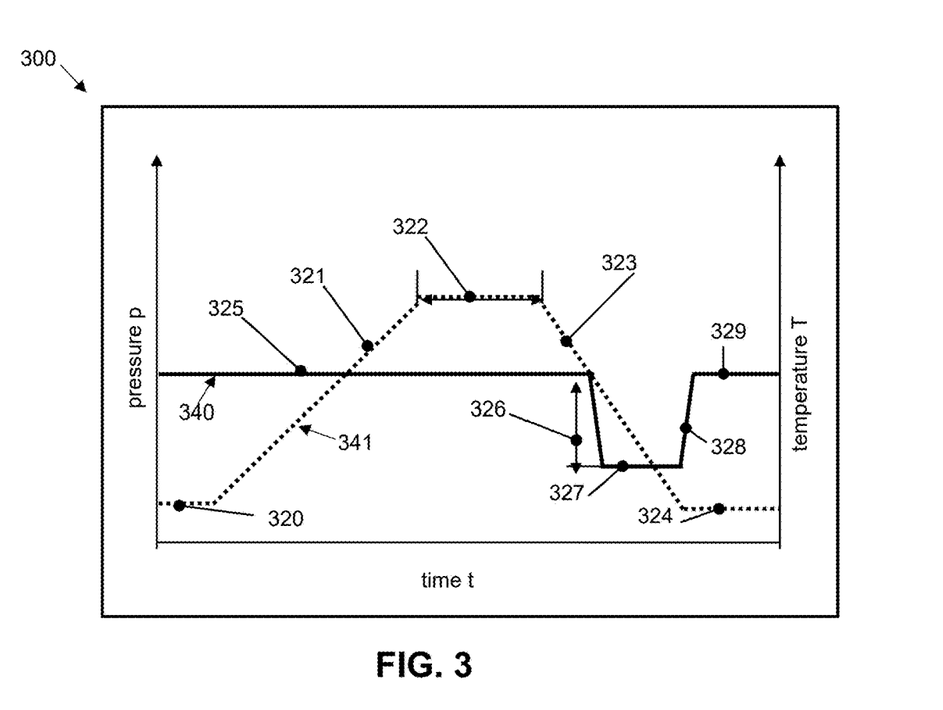
FIG. 3 shows an exemplary profile of the pressure or the temperature, respectively, depending on the time during performing of the method according to some embodiments.

FIG. 3 shows an exemplary profile 300 of an internal pressure as continuous line 340 and a temperature of the starting material as dotted line 341 depending on the duration of the process during the performing of an example of a method according to the present disclosure. At the beginning, the starting material is at room temperature 320 or slightly higher (e.g., 10-15° C.) due to residual heat of the mold from previous manufacturing processes or the waste heat of the entire assembly. The internal pressure 325 of the filled and sealed mold is atmospheric pressure at the beginning of the method. By means of a constant temperature ramp 321, the starting material is heated to melting temperature or above, and left at this temperature for a certain, preferably isothermal, holding time 322. The holding time 322 above the melt temperature may ensure that the entire starting material is present in a softened or melt-like state, or at least that sintering is possible by softening the surface of the particles. On the other hand, by keeping the melt above the melting temperature, a number of dissolved gas inclusions in the melt may be reduced. When heat is introduced into the material via the mold, this occurs first in the layer in contact with the mold wall and then spreads further into the interior of the melt. Thus, over a specific holding time 322, for example, a foam-free outer layer and/or an integral foam structure may be achieved in the produced foam component. After the end of the isothermal holding time 322, the cooling process 323 begins. During the cooling process 323, now a pressure reduction 326 takes place. The point in time of the pressure reduction 326, and thus the vacuum application temperature, within the cooling process 323 may be made dependent on the viscosity of the melt, which increases during the cooling process 323. Due to the pressure reduction 326, the undissolved gas inclusions in the softened starting material (i.e., the melt) expand, causing the foaming. Once the internal pressure of the gas inclusions has adapted to the reduced internal pressure of the mold, the foaming is complete. The holding time 327, during which the underpressure is maintained, may depend on the viscosity, the absolute value of the pressure reduction, and other parameters of the foaming. When the foamed material has finally solidified again due to the cooling process 323 and the foam has stabilized, the internal pressure may be increased again 328 until atmospheric pressure 329 is reached, the mold may be opened and the at least partially finished foam component may be removed. In addition to the exemplary profile 300, further profiles are also possible within the scope of the present disclosure, with, in particular, different points in time and absolute values of at least one temperature change and at least one pressure change.

Figure 4:
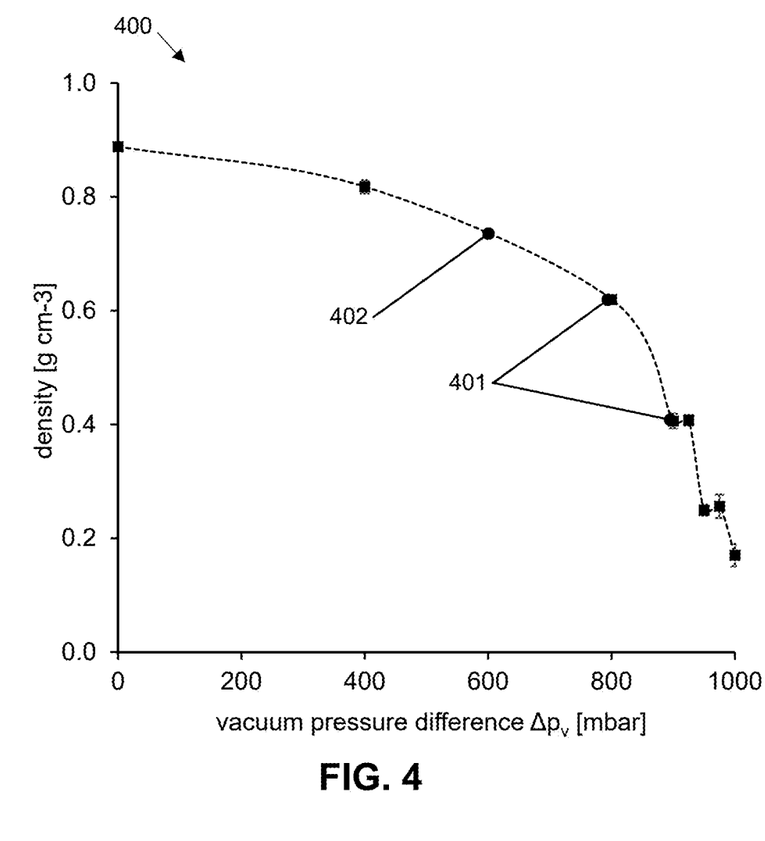
FIG. 4 shows a profile of the density of a foam component according to some embodiments depending on an induced pressure reduction.

FIG. 4 shows an experimentally determined profile 400 of a density of a manufactured foam component depending on the induced pressure change. To establish the profile 400, at least eight foam components were produced under different induced pressure changes, their density was determined according to DIN EN ISO 845 standard, and between the resulting measuring points 401 it was interpolated 402. Since the density reduction in the present case is based on the expanded gas inclusions, this may be regarded as a measure of the foaming or the degree of foaming. Thus, curve 402 clearly shows that for the disclosed method for producing a foam component, a few hundred millibars may be sufficient to cause the foaming. At a pressure difference of only one bar, for example, the density of a foam component according to the present disclosure may be reduced to more than one third without the use of additional blowing agents. Thus, the method according to the present disclosure is particularly suitable for lightweight construction, for producing buoyancy aids, such as for boats, swimming aids or surfboards, or other fields of application.

Figure 5A:
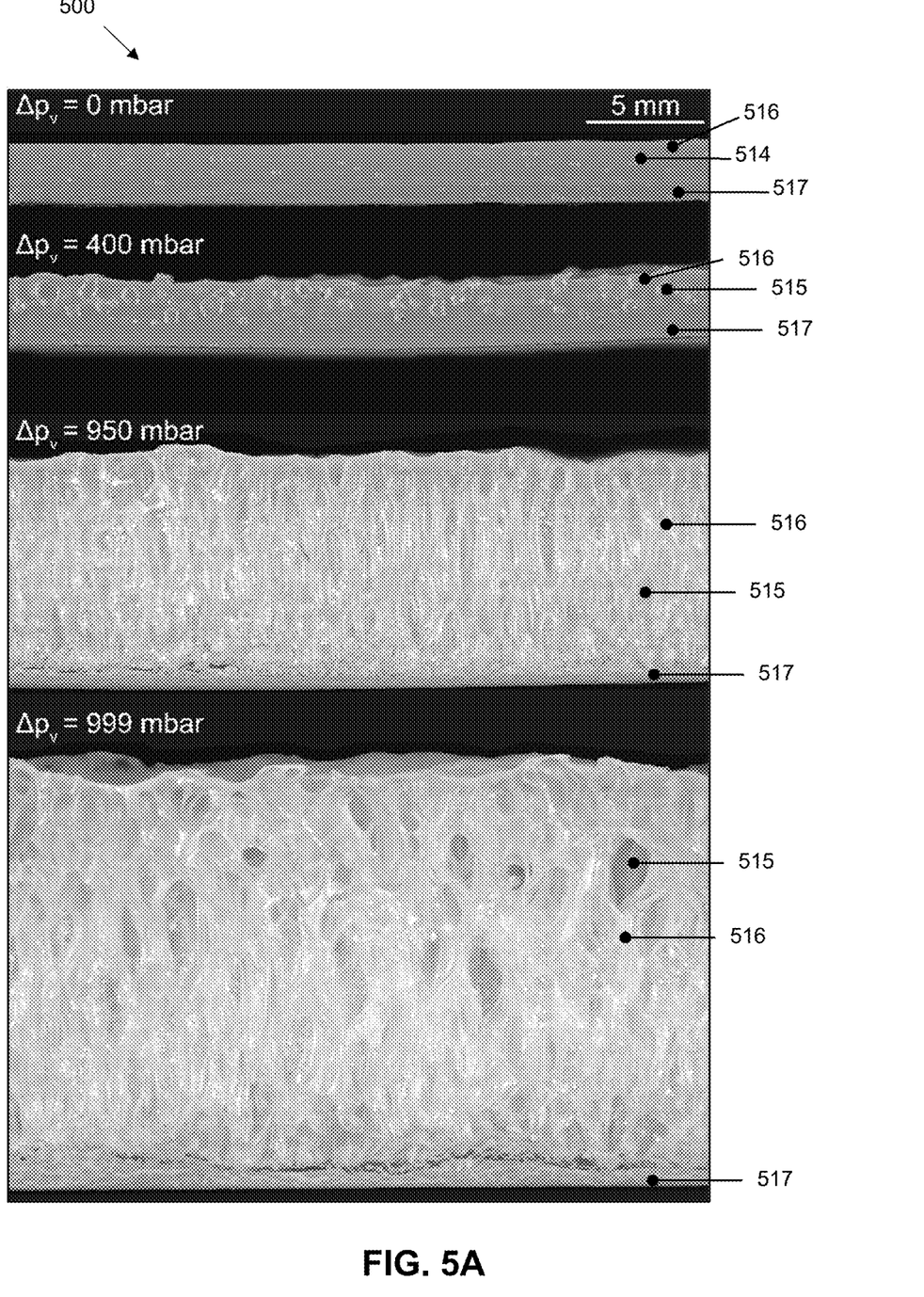
FIGS. 5A-5B show a schematic illustration of a foam component according to some embodiments after inducing different pressure reductions.
Figure 5B:
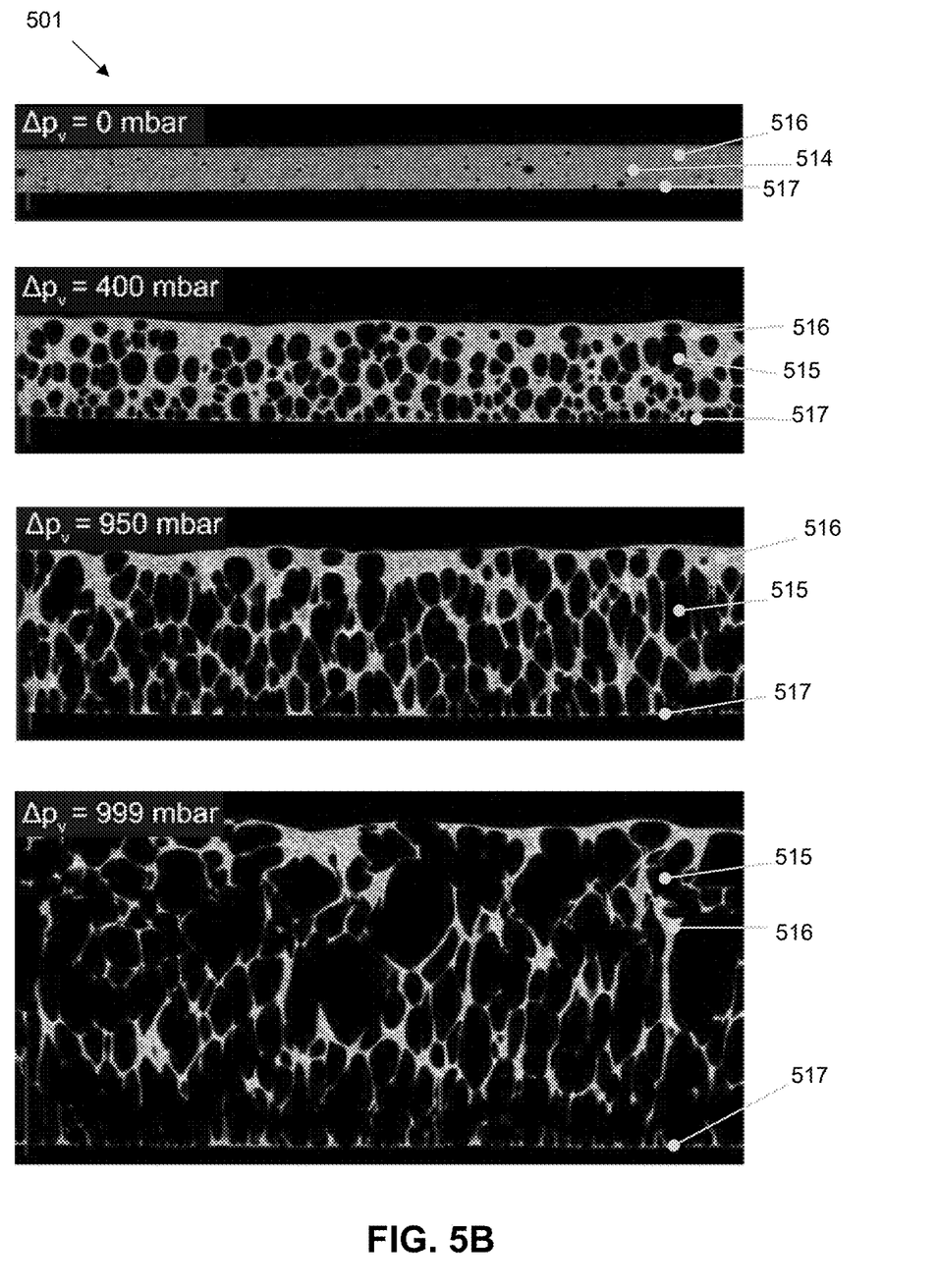

In FIG. 5A photographic images 500 and in FIG. 5B computed tomography images 501 of foam components according to the present disclosure with different degrees of foaming or density are schematically represented. When producing the foam components, high-density polyethylene, PE-HD, was used, wherein other starting materials, in particular thermoplastic or cross-linking polymer materials, may also be used within the scope of the present disclosure. If no pressure difference is induced in a manufacturing process according to the present disclosure, i.e., $\Delta p_v=0$, gas inclusions 514 may occur in the solidified starting material 516 due to the particulate starting material, but these are not present in expanded form. There are also no expanded gas inclusions in the edge layer 517 which was in contact with the mold wall. Thus, in this case, it is a region of a foam component that was present during production in a part of a mold in which the foaming was not caused. This behavior already changes with an induced pressure reduction of $\Delta p_v=400$ mbar, such that the gas inclusions 515 in the solidified starting material 516 are already present in expanded form. In FIG. 5B it may be easily seen that the majority of the expanded gas inclusions 515 are closed-cell.

If the induced pressure difference is increased to $\Delta p_v=950$ mbar or $\Delta p_v=999$ mbar, as also shown in FIGS. 5A and 5B, the size of the expanded gas inclusions 515 in the solidified starting material 516 increases further. In the case of a pressure change of $\Delta p_v=950$ mbar, the gas inclusions are essentially mixed-cell (i.e., with a few exceptions) mixed-cell. This changes with a further increase of the pressure difference to $\Delta p_v=999$ mbar, wherein in this case the gas inclusions 515 are essentially open-cell. It is noted that the edge layer 517 always comprises fewer gas inclusions than the remaining rest of the solidified starting material 516. The thickness of this edge layer 517 may be between 0.1 mm and 2.0 mm, but preferably between 0.5 mm and 1.5 mm.

Overall, it can be shown with FIGS. 5A and 5B that the density of a foam component according to the present disclosure is at least partially adjustable by an amount of the pressure change.

Figure 6A:
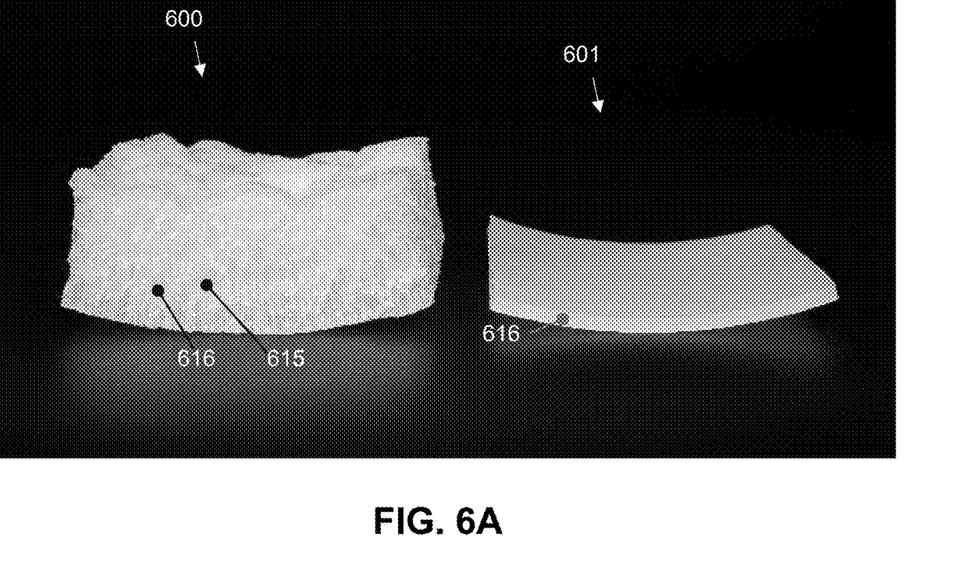
FIGS. 6A-6E show a schematic illustration of different foam components according to some embodiments.

FIG. 6A shows a foam component 600 according to the present disclosure and a part 601 of a foam component according to the present disclosure, in which no foaming has occurred, side by side for direct comparison. Both foam components 600, 601 consist of solidified starting material 616, wherein only in the foam component 600 expanded gas inclusions 615 are clearly visible. The gas inclusions cause a considerable increase in the volume, especially in the thickness, of the foam component 600. Thus, the present disclosure allows the production of foam components 600 with a lower density compared to the unfoamed starting material without the use of additional blowing agents.

Figure 6B:
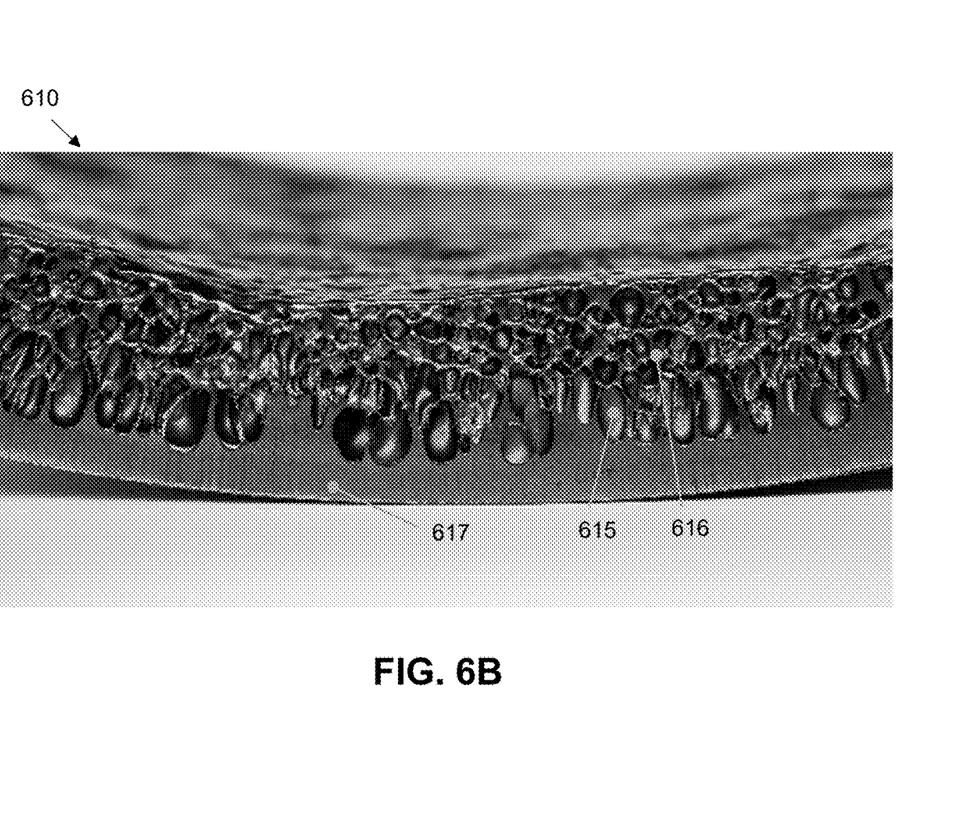

FIG. 6B shows a schematic close-up cross-section of another foam component 610, which was made of thermoplastic polyurethane, TPU, for example. The foam component 610 comprises expanded gas inclusions 615 in the solidified starting material 616. In addition, an edge layer 617, which was in contact with the mold wall during production, for example, is free of gas inclusions. In this way, the method according to the present disclosure may be used particularly efficiently for producing integral foam structures without the use of blowing agents.

Figure 6C:
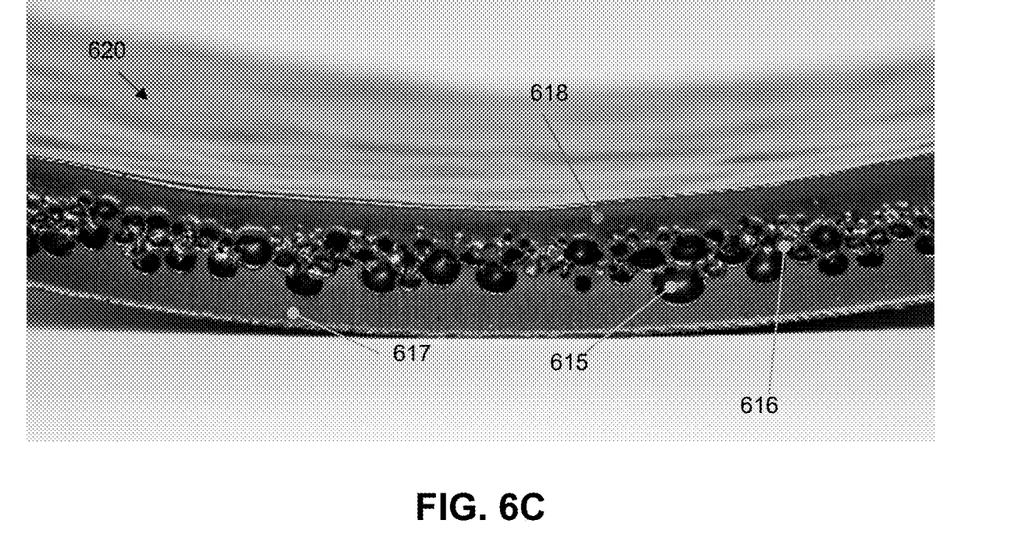

FIG. 6C schematically shows another foam component 620 according to the present disclosure Similar to foam component 610, foam component 620 also comprises a gas inclusion-free edge layer 617 and expanded gas inclusions 615 in the solidified starting material 616. In this case, however, a further edge layer 618, which also comprises no gas inclusions, was applied to the foam component 620. The second edge layer 618 may also consist of the solidified starting material 616 or a different material. A possible production method for foam component 620, in case it was produced from a starting material, may comprise the following steps: providing a particulate starting material in a mold; closing the mold and inducing a vacuum in the mold; softening a first portion of the starting material, in particular the portion corresponding to the edge layer 617; providing atmospheric pressure in the mold; softening a second portion of the starting material, in particular the portion in which gas inclusions are intended, the softening of the second portion being performed at atmospheric pressure; inducing an under pressure to cause a foaming in the second portion; softening a third portion at under pressure, in particular the portion corresponding to the edge layer 618; solidifying the foamed and non-foamed starting material, providing atmospheric pressure after the solidifying and subsequently opening the mold. In this way, the foaming may be individually adjusted in each of these regions by means of a temperature and pressure profile in at least two regions within the mold. Thus, the present disclosure is particularly suitable for providing individual layers with different degrees of foaming and thus properties of a foam component within one production process, wherein a subsequent gluing of the individual layers may be dispensed with. It should be noted that the method according to the present disclosure is not limited to three layers. More than three layers and/or a use of different materials in the individual layers may also be provided for by a method of the present disclosure.

Figure 6D:
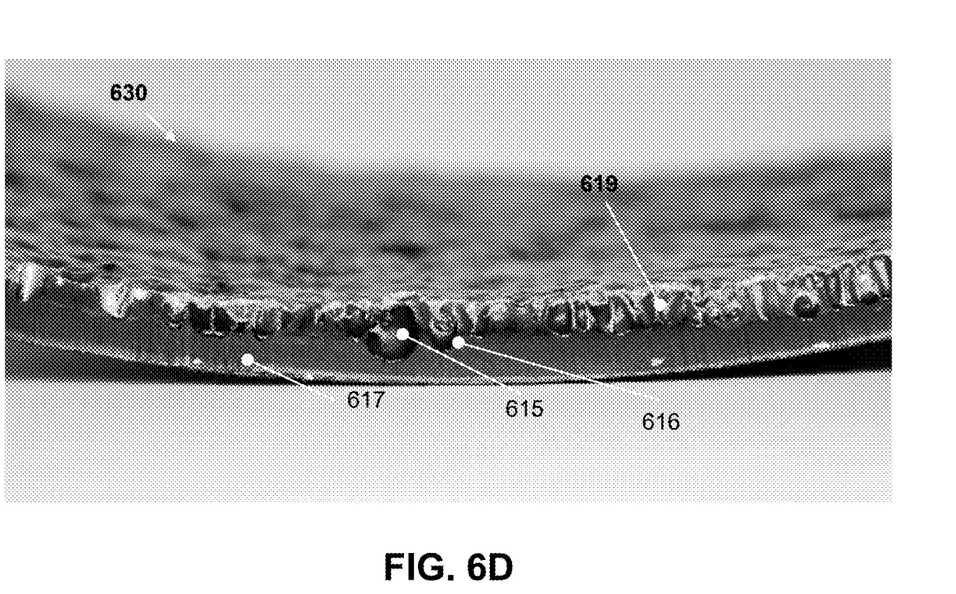

FIG. 6D schematically shows another foam component 630 according to the present disclosure. Similar to the foam components 610, 620, the foam component 630 also comprises a gas inclusion-free edge layer 617 and expanded gas inclusions 615 in the solidified starting material 616. In this case, however, a further edge layer 619, which also comprises gas inclusions, was applied to the foam component 630. The edge layer 619 comprises a different starting material than the solidified starting material 616, but may also comprise the same material. In some embodiments, the edge layer 619 consists of a different starting material than the solidified starting material 616. In some embodiments, the edge layer 619 consists of the same material as the solidified starting material 616. Likewise, the second material may comprise a filler, such as fibers, or a reinforcing element in which the foaming is not caused. The second material may be at least partially surrounded or enclosed by the solidified material.

Figure 6E:
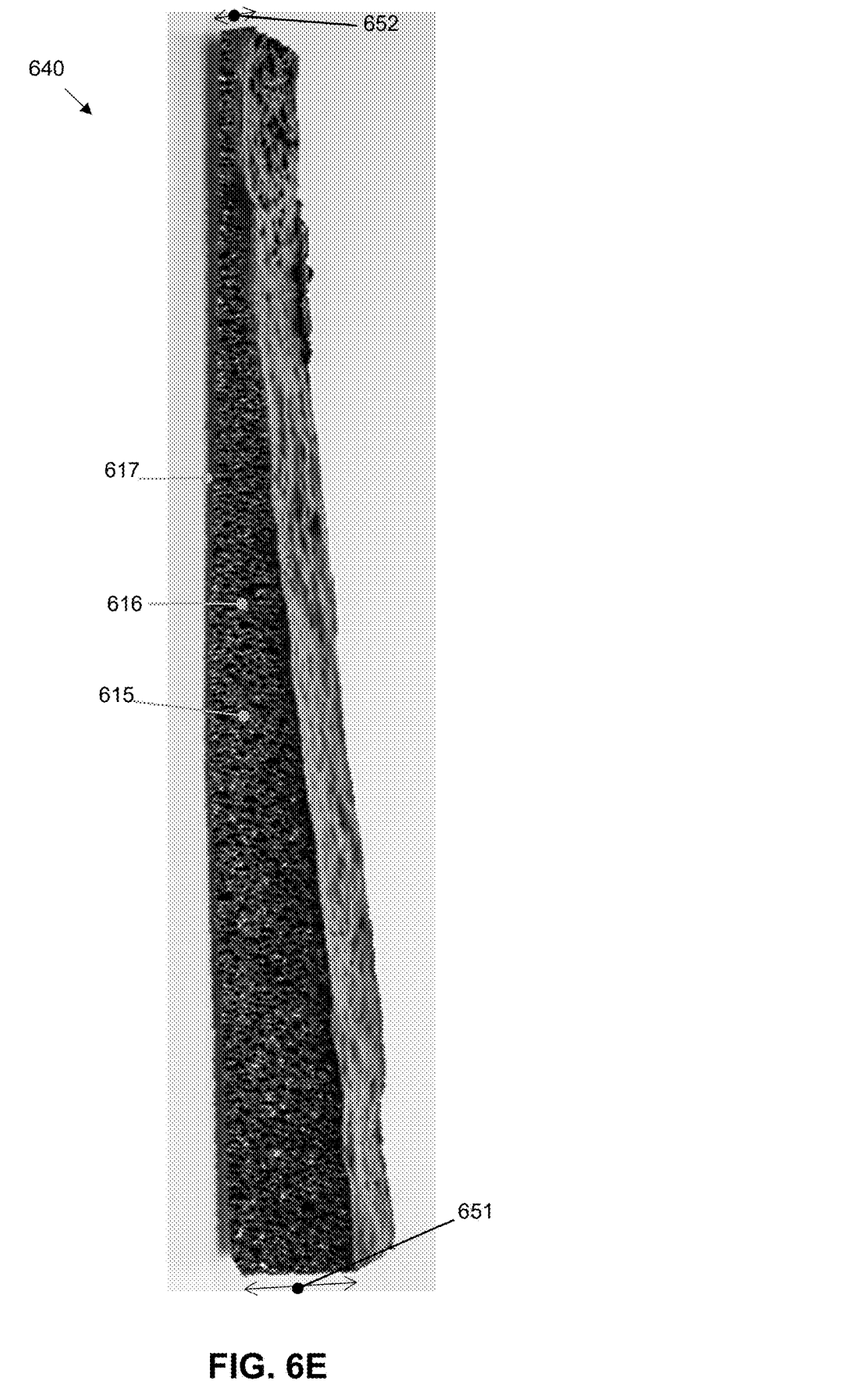

FIG. 6E schematically illustrates another foam component 640 according to the present disclosure. Similar to the foam components 610, 620, 630, the foam component 640 also comprises expanded gas inclusions 615 in the solidified starting material 616. In this case, the edge layer 617 is much thinner than in the previous embodiments 610, 620, 630, similar to foam component 600. A further difference is the graded increase in thickness of foam component 640, from a smallest thickness 652 to a largest thickness 651. An essentially trapezoidal structure of the foam component 640 may, for example, be deliberately adjusted by means of a mold wall that is not perpendicular to gravity, on which the particulate starting material is provided, softened and, after a reduction in pressure, solidified again. Likewise, the essentially trapezoidal structure of foam component 640 may be caused by an induced pressure change at a graded temperature profile along the mold. The graded temperature profile along the mold may lead to a graded viscosity of the softened starting material, which may affect the degree of foaming or the size of the expanded gas inclusions, for example. To the same extent, other shapes of foam components may be adjusted by the orientation and shape of the mold. On the other hand, a trapezoidal shape of the foam component, similar to foam component 640, may also be achieved by graded foaming. This may be achieved, for example, by holding times at graded temperatures within the mold, which allows the number or density of gas inclusions to be adjusted. Alternatively, a graded pressure difference may be induced along the softened starting material. In these cases, however, a degree of foaming, density, cell size, or other parameters of the foam produced would also be graded along the solidified starting material.

Possible foam components that are free of additional blowing agents and may be obtained by the method according to the present disclosure are, for example, insulating materials. Due to the expanded gas inclusions and a usually poor conductivity of these gases, especially a poor thermal conductivity, they may be advantageously used for insulation, especially for thermal insulation.

Other foam components which are free of additional blowing agents and may be produced by the method according to the present disclosure are, for example, damping materials, especially for sports articles. An advantage of producing shoes by means of the described method is, for example, that the production is possible completely without lasts. Shoe production without lasts according to the disclosed method is more flexible and saves time and costs. Furthermore, the method according to the present disclosure is advantageous for producing multilayer elements, such as those required for shoe soles or protectors, in a single production process, since subsequent bonding of the different layers or elements may be dispensed with. In addition, the produced sports articles, in particular sportswear, are better suited for direct contact with the skin than comparable state-of-the-art sports articles due to the absence of additional blowing agents.

In addition, sports articles such as balls, protectors, helmets, shin guards, bags, backpacks, rackets, etc. may be partially or completely manufactured by means of the method according to the present disclosure. In the case of protectors, depending on the part of the body to be protected, they may be obtained, for example, by means of a substantially cylindrical shape of the mold adapted to the part of the body to be protected. In an optional post-processing step, the resulting foam component may be cut in half to enable putting on a breastplate, for example. The protectors may also be adapted for attachment to sportswear.

Finally, buoyancy aids, such as floats, boats, swimming aids, surfboards, or others, may also be produced using the method according to the present disclosure. Due to the adjustable foaming, a density, and thus a buoyancy, may be adjusted directly during production. This may eliminate the need for complex methods of combining and connecting several different buoyancy bodies.

The invention claimed is:

1. A method for producing a foam component, comprising the steps of:
   providing a particulate starting material in a mold;
   softening the starting material in the mold;
   inducing a pressure change within the mold to cause foaming in at least a portion of the softened starting material without the use of a chemical blowing agent, wherein the pressure change comprises a reduction in pressure and wherein the foaming caused by the pressure change reduces the density of the particulate starting material by more than one third; and
   solidifying the foamed starting material.

2. The method according to claim 1, wherein the starting material comprises particles of a size of 0.01 to 3 mm.

3. The method according to claim 1, wherein the starting material comprises a thermoplastic or crosslinking polymer material.

4. The method according to claim 1, wherein the softening comprises trapping inclusions of at least one gas between particles of the starting material.

5. The method according to claim 4, wherein the foaming is caused by expansion of the at least one gas in the inclusions trapped between particles of the softened starting material.

6. The method according to claim 1, wherein the softening comprises heating the starting material.

7. The method according to claim 6, wherein the heating of the starting material comprises heating by direct heat input into the starting material or heat input via the mold.

8. The method according to claim 6, wherein a number of gas inclusions in the softened starting material is adjustable via a temperature profile of the heating.

9. A method for producing a foam component, comprising the steps of:
   providing a particulate starting material in a mold;
   softening the starting material;
   inducing a pressure change within the mold to cause foaming in at least a portion of the softened starting material without the use of a chemical blowing agent, wherein the pressure change comprises a reduction in pressure and wherein the foaming caused by the pressure change reduces the density of the particulate starting material by more than one third; and
   solidifying the foamed starting material into a foam component comprising an edge layer that is in contact with the mold and is free of expanded gas inclusions.

10. The method according to claim 9, wherein the edge layer comprises a thickness of 0.1 to 2.0 mm.

11. The method according to claim 1, wherein a processing temperature of the starting material is above its melting temperature.

12. The method according to claim 1, wherein a temperature within the mold is different in at least two regions of the mold.

13. The method according to claim 1, wherein the pressure change is 0.05 to 5.0 bar.

14. The method according to claim 1, wherein an initial pressure in the mold before the softening corresponds to atmospheric pressure or overpressure.

15. The method according to claim 14, wherein the overpressure comprises compressed air or nitrogen.

16. The method according to claim 1, wherein the inducing of the pressure change comprises inducing the pressure change upon reaching a melting temperature of at least a portion of the starting material.

17. The method according to claim 1, wherein an absolute value of the pressure change within the mold is different in at least two regions of the mold.

18. The method according to claim 12, wherein the foaming in each of the at least two regions is individually adjustable by a temperature or pressure difference in the at least two regions within the mold.

19. The method according to claim 1, wherein foaming is not induced in at least one region of the mold.

20. The method according to claim 1, wherein the solidifying comprises solidifying after the inducing the pressure change.

21. The method according to claim 1, wherein the solidifying comprises cooling of the foamed starting material.

22. The method according to claim 1, wherein a density of the foam component is at least partially adjustable by an amount of the pressure change.

23. The method according to claim 1, wherein a structure of the foam component is at least partially influenced by at least one of the following properties of the starting material: material of the particles, particle shape, particle size, and particle size distribution.

24. The method according to claim 1, further comprising introducing a second material into the mold.

25. The method according to claim 24, wherein the second material comprises a filler or a reinforcing element.

26. The method according to claim 24, wherein no foaming occurs in the second material.

27. The method according to claim 1, comprising maintaining the reduction of the pressure while solidifying the foamed starting material.

28. The method of claim 1, wherein the pressure change is in an amount of 0.05 to 5.0 bar.

29. The method of claim 1, comprising softening the starting material in the mold to a viscosity in a range of $10^2$ to $10^4$ Pa·s.

30. The method of claim 1, comprising softening the starting material in the mold to a viscosity in a range of $10^1$ to $10^5$ Pa·s.

* * * * *

UNITED STATES PATENT AND TRADEMARK OFFICE
CERTIFICATE OF CORRECTION

PATENT NO. : 12,378,382 B2
APPLICATION NO. : 17/170131
DATED : August 5, 2025
INVENTOR(S) : Nürnberg et al.

It is certified that error appears in the above-identified patent and that said Letters Patent is hereby corrected as shown below:

In the Claims

In Column 18, Claim 29, Line 18, delete "$10^4$ Pa-s." and insert -- $10^4$ Pa·s. --, therefor.

Signed and Sealed this
Sixteenth Day of September, 2025

Coke Morgan Stewart
*Acting Director of the United States Patent and Trademark Office*